United States Patent
Kröner et al.

(10) Patent No.: US 6,926,362 B2
(45) Date of Patent: Aug. 9, 2005

(54) DEVICE FOR ADJUSTMENT OF A BACKREST INCLINATION

(75) Inventors: Gregor Kröner, Bischberg (DE); Jochen Hofmann, Bahnhofstrasse (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 0 days.

(21) Appl. No.: 10/380,936

(22) PCT Filed: Sep. 21, 2001

(86) PCT No.: PCT/DE01/03700

§ 371 (c)(1), (2), (4) Date: Mar. 19, 2003

(87) PCT Pub. No.: WO02/24480

PCT Pub. Date: Mar. 28, 2002

(65) Prior Publication Data

US 2004/0036334 A1 Feb. 26, 2004

(30) Foreign Application Priority Data

Sep. 21, 2000 (DE) .......................... 100 48 228

(51) Int. Cl.⁷ .............................. B60N 2/10; B60N 2/12; B60N 2/20
(52) U.S. Cl. ............. 297/354.12; 297/367; 297/378.12; 297/378.14
(58) Field of Search ........................ 297/378.14, 378.12, 297/354.12, 367

(56) References Cited

U.S. PATENT DOCUMENTS

| | | | |
|---|---|---|---|
| 4,147,386 A | | 4/1979 | Stolper |
| 4,756,577 A | * | 7/1988 | Berg et al. .......... 297/378.14 X |
| 6,464,299 B1 | * | 10/2002 | Castagna ............ 297/378.14 X |
| 6,540,232 B2 | * | 4/2003 | Hansel et al. ....... 277/278.14 X |
| 6,598,938 B2 | * | 7/2003 | Boltze et al. ....... 297/378.12 X |
| 6,685,270 B2 | * | 2/2004 | Haglund ............ 297/378.12 X |

FOREIGN PATENT DOCUMENTS

| | | |
|---|---|---|
| DE | 24 59 070 A1 | 6/1975 |
| DE | 30 08 764 A1 | 9/1981 |
| DE | 4324734 A1 * | 1/1995 ............ 297/378.12 |
| EP | 1 026 028 A1 | 8/2000 |
| FR | 2 649 942 A1 | 1/1991 |

OTHER PUBLICATIONS

English translation of International Preliminary Examination Report (IPER) for International Application PCT/DE01/037700 filed Sep. 21, 2001.

English Partial Translation of Application No. DE 24 59 070 A1, published Jun. 19, 1975 (DE 24 59 070 A1 previously submitted).

English Partial Translation of Application No. DE 30 08 764 A1, published Sep. 24, 1981 (DE 30 08 764 A1 previously submitted).

English Partial Translation of Application No. FR 2 649 942 A1, published Jan. 25, 1991 (FR 2 649 942 A1 previously submitted).

* cited by examiner

Primary Examiner—Rodney B. White
(74) Attorney, Agent, or Firm—Christie, Parker and Hale, LLP

(57) ABSTRACT

A device for adjustment of the backrest inclination for a backrest of a seat in a motor vehicle includes a backrest connected to a rotating locking device. The device may be locked in defined lock positions for adjustment of the inclination, by means of a locking element which may be positionally adjusted. The locking element may be placed in a defined spatial position, by means of at least one operating mechanism, such that the locking element is in a position to be locked in only a partial number of the possible locking positions. A defined adjustment of the inclination is thus achievable in a simple manner.

13 Claims, 20 Drawing Sheets

DEVICE FOR ADJUSTMENT OF A BACKREST INCLINATION

CROSS-REFERENCE TO RELATED APPLICATION

This application is a National Phase Patent Application of International Application Number PCT/DE01/03700, filed on Sep. 21, 2001, which claims priority of German Patent Application Number 10 228.7, filed Sep. 21, 2000.

FIELD OF THE INVENTION

The invention relates to a device for the adjustment of a backrest of a seat.

BACKGROUND OF THE INVENTION

Motor vehicles such as cars, trucks, vans, sport utility vehicles, buses and the like, include seats which are desirably adjustable. It is generally desirable to provide such a motor vehicle seat with a backrest that is adjustable to various degrees of inclination, that is, multiple positions to provide versatility and comfort for various users. It is further desirable to adjust the backrest in a simple manner and to securely lock the backrest in its various locked positions.

SUMMARY OF THE INVENTION

The object of the present invention is to provide a device in which defined backrest inclinations can be adjusted in simple manner.

This is achieved according to the invention through a device having the features of a rotatable detent locking means which is connected to the backrest. In order to adjust the backrest inclination the detent locking means can be locked in defined detent positions by a locking element which is adjustable in position. The locking element can thereby be brought into a defined spatial position by means of at least one operating mechanism such that, in one position, the locking element can be locked in only a partial number of the possible locking positions.

Different inclines of the backrest can be readily controlled by matching the defined detent locking positions and the defined positions of the detent locking means.

BRIEF DESCRIPTION OF THE DRAWINGS

The invention will now be explained in further detail with reference to the embodiments illustrated in the drawings in which.

DETAILED DESCRIPTION

Figure 1:
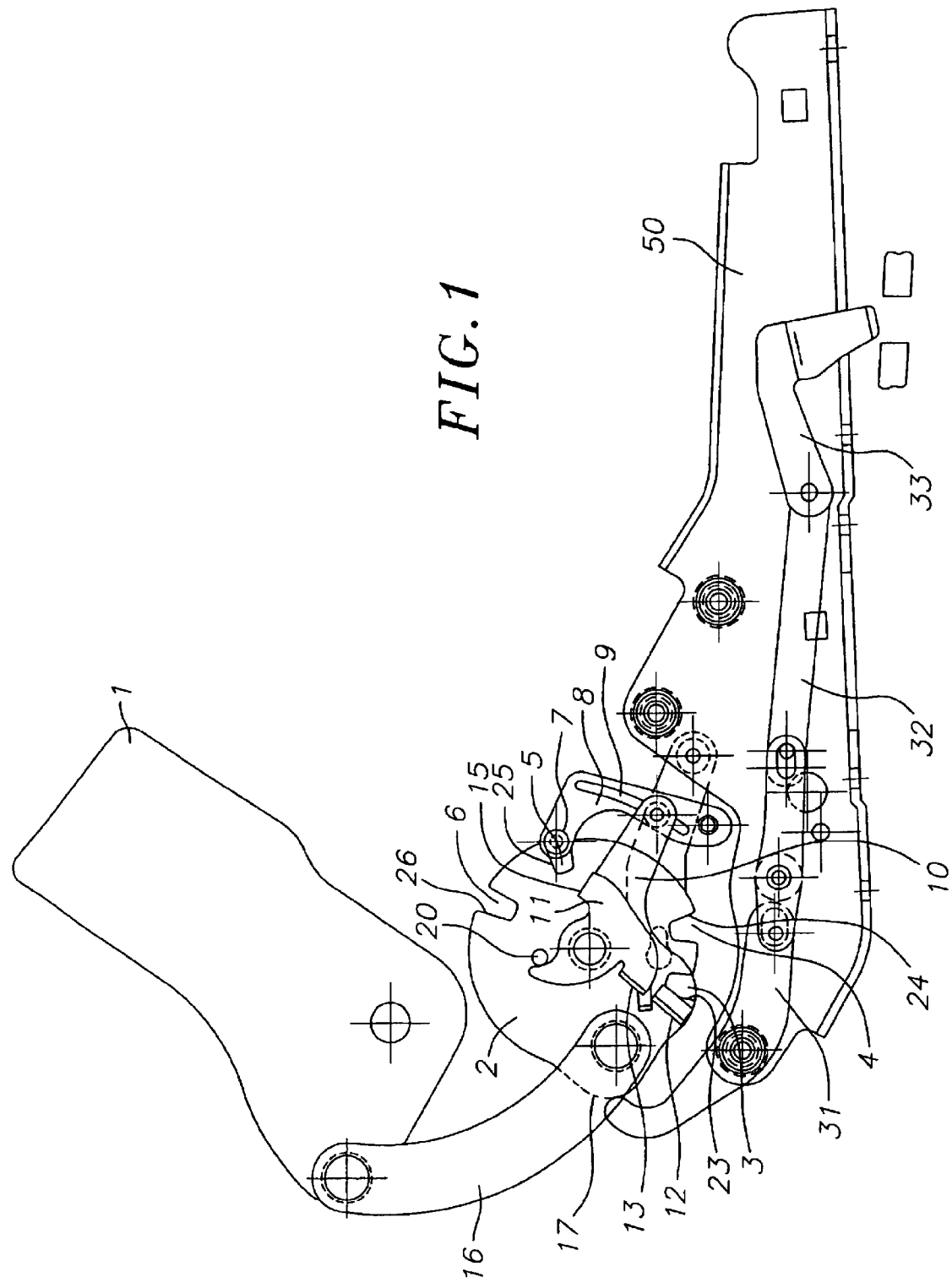
FIG. 1 shows a side view (drive direction to the right) of an exemplary embodiment of a device for adjusting the backrest incline.

FIG. 1 shows in a side view a device for adjusting the incline of a backrest 1 in a motor vehicle. The backrest 1 which is shown diagrammatically is thereby part of a seat (not shown here) which may be the seat in an automobile, truck, van, sport utility vehicle, bus or other motor vehicle. The part of the seat is thereby a side part 50 which can be moved forwards and backwards horizontally (right to left or vice versa in FIG. 1). In FIG. 1 it is assumed that a person seated on the seat is looking to the right in the drive direction.

In an exemplary embodiment, the device according to the invention is shown using the example of a backrest 1 in a van and in which the device adjusts the backrest 1 in four definable positions. Basically the invention relates however to any adjustment of generally more than two positions of the backrest 1.

To provide such adjustment, the invention provides a detent locking means which, in the illustrated embodiment, is a cam disc 2 with four recesses 3, 4, 5, 6. Other detent locking means, including members having other shapes and different numbers of recesses, may be used in other exemplary embodiments.

The backrest 1 is connected eccentrically to the cam disc 2 through a connector 16 so that swivel movement of the backrest 1 is converted into a rotational movement of the cam disc 2.

The exemplary cam disc 2 has here four recesses 3, 4, 5, 6 which can be brought into engagement with a detent locking element such as locking bolt 7 on a locking lever 8 which is pretensioned with spring force (see FIGS. 4 to 11). The recesses 3, 4, 5, 6, when the locking bolt 7 is received therein, thereby correspond to different inclines of the backrest 1. Recesses 3, 4, 5 and 6 correspond to the first, second, third and fourth exemplary locking positions, respectively and the cam disc 2 is in locked position when locking bolt 7 is secured within one of the recesses 3, 4, 5, or 6.

FIG. 1 shows the third operating position (see also FIGS. 8, 9) used to explain the interaction of the individual component parts. Third operating position corresponds to recess 5.

The third operating position relates to an "easy entry" function of a seat where climbing into the back of the vehicle is to be made easier. The backrest 1 is thereby folded relatively far forwards and sliding the seat forward is also possible.

Sliding the seat forwards thereby becomes possible by a cam 17 of the cam disc 2 actuating an articulated lever chain 31, 32, 33. The articulated lever chain 31, 32, 33 consists of three articulated levers which are each able to swivel about respective rotary points.

In the illustrated operating position the cam 17 presses a first articulated lever 31 which is pretensioned against the same in a counterclockwise direction. A second articulated lever 32 which is connected rotatable to one end of the first articulated lever 31 is thereby swivelled clockwise.

At the end of the second articulated lever 32, which is opposite the connection between the first and second articulated levers, the second articulated lever 32 is connected rotatably to a third articulated lever 33. The clockwise rotation of the second articulated lever 32 results in the counterclockwise swivel movement of the third articulated lever 33.

At the free end of the third articulated lever 33 is a hook which can be locked with a fixed part of the motor vehicle. This is shown diagrammatically as au opening in FIG. 1. The hook is drawn out from the opening through the aforementioned swivel movement of the third articulated lever 33 so that the locking action is released and the seat becomes adjustable.

In another exemplary embodiment, the force transfer from the cam disc 2 to a locking means (e.g. a hook) can be produced using a Bowden cable.

A series of component parts are used for controlling the locking bolt 7 relative to the four recesses 3, 4, 5, 6.

A first rotational element 11 is mounted rotatable on the same shaft as the cam disc 2. The first rotational element 11 has a hooked follower 15 which can transfer a force to a second rotational element 10 lying between the cam disc 2 and the first rotational element 11. The second rotational element 10 is only visible in part in FIG. 1 and has substantially the shape of a large "L" in an exemplary embodiment. The second rotational element 10 is also mounted on the same shaft as the cam disc 2.

The rotational elements 10, 11 and a lever (not shown in FIG. 1) are operating mechanisms for the locking bolt 7 whereby the lever can be operated independently of the rotational elements.

The first rotational element 11 has a first Bowden cable fixing point 13 on which a first Bowden cable (not shown) may be fixed. If this first Bowden cable is pulled then the first rotational element 11 is moved clockwise. The first rotational element 11 is in any case designed so that the rotational movement can only be executed up to a certain angle. After moving in the clockwise direction a part of the first rotational element 11 strikes against a stop 20 which is mounted on a component part which is not shown. Hereinafter, for reasons of clarity, stop 20 is not shown in any of the following figures. This stop 20 defines an end position for the rotation of the first rotational element 11.

The second rotational element 10 has on the short side of the large "L" a second Bowden cable fixing point 12 at which a second Bowden cable (not shown) may be fixed. If this Bowden cable is pulled then the second rotational element 10 is moved in the clockwise direction. As such, first rotational element 11 and second rotational element 10 are independently operable.

The long side of the L-shaped second rotational element 10 has a cam which engages with a slide guide 9 of the locking lever 8. The locking lever 8 is substantially L-shaped whereby the locking bolt 7 is mounted on the short side. The locking lever 8 is mounted for swivel movement at the end of its long side.

If the second rotational element 10 is swivelled clockwise then the cam which is in engagement with the slide guide 9 executes a rotational movement which is converted by means of the slide guide 9 into a rotational movement of the locking lever 8 in the clockwise direction. This rotational movement leads in turn to the locking bolt 7 being engaged or disengaged from one of the recesses 3, 4, 5, 6. A clockwise swivel movement of locking lever 8 thereby leads to disengagement of locking bolt 7 from the corresponding recess; a counterclockwise swivel movement of locking lever 8 thereby leads to engagement of locking bolt 7 in the corresponding recess, in the exemplary embodiment illustrated in FIG. 1.

The first recess 3 and the second recess 4 are brought into or out of engagement with the locking bolt 7 through a lever (not shown) which rotates cam disc 2 and adjusts the position of backrest 1.

Figure 2:
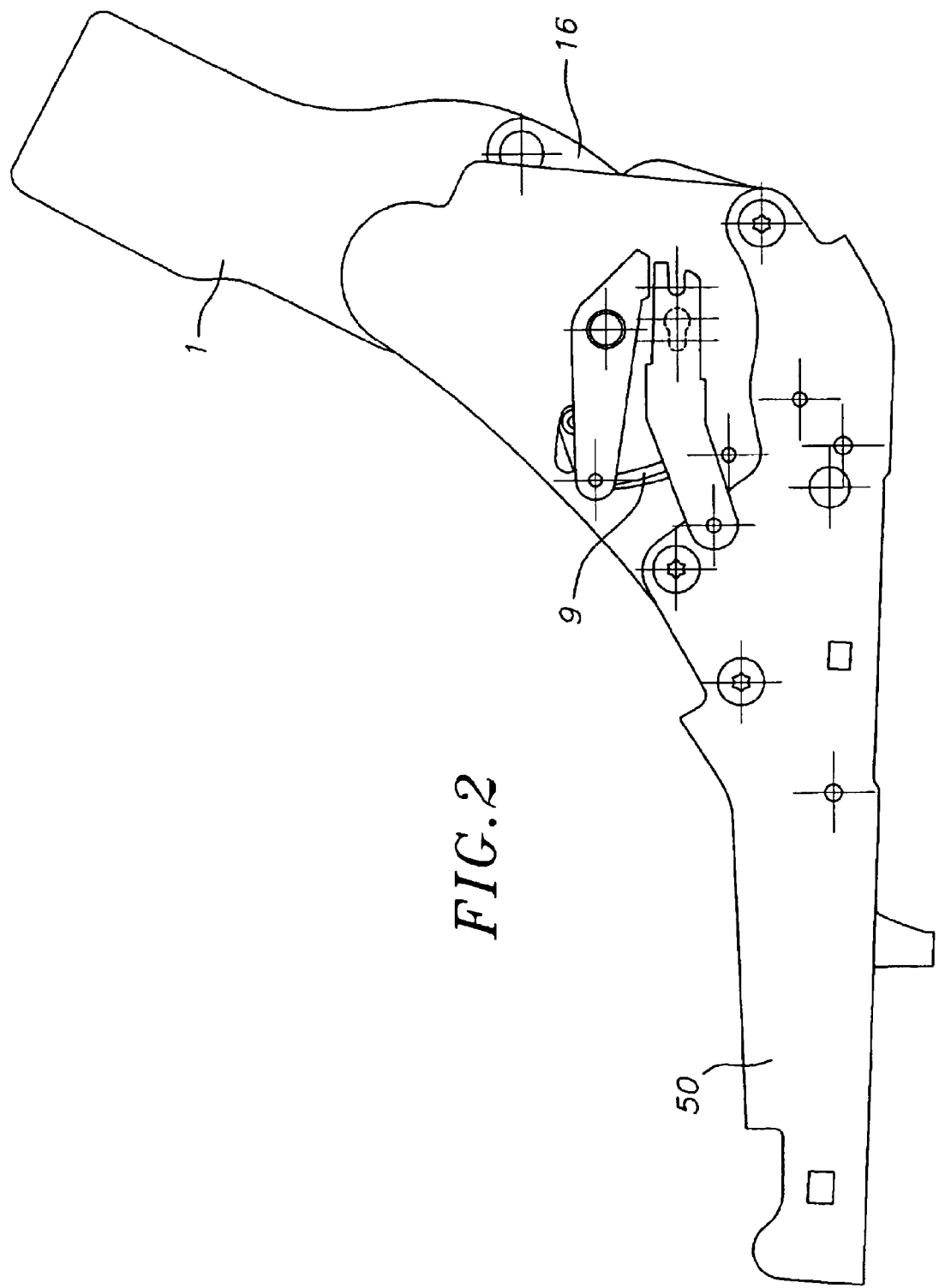
FIG. 2 shows a side view (drive direction to the left) of an exemplary embodiment of the device for adjusting the backrest incline.
Figure 3:
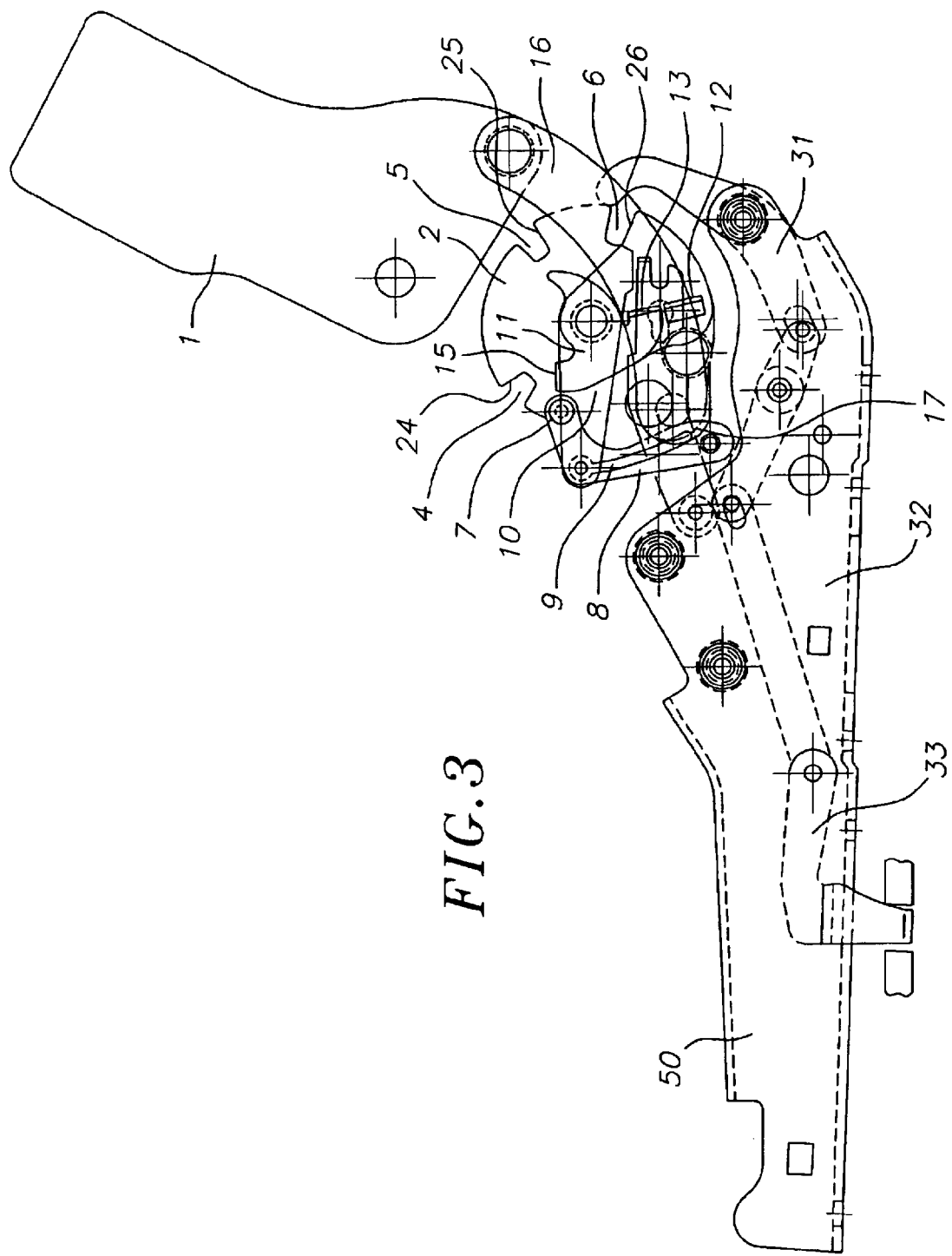
FIG. 3 is a partial cross-section illustration of the side view of FIG. 2 showing additional elements not shown in FIG. 2.

FIGS. 2 and 3 show the device for adjusting the backrest inclination from the opposite side of the seat shown previously in FIG. 1; i.e., the drive direction is to the left in FIGS. 2 and 3. The locking bolt 7 is thereby shown engaged in the first recess 3, which is partially obscured in FIGS. 2 and 3.

According to the invention the locking bolt 7 can be moved in a defined way so that it can only come into engagement with the associated recesses 3, 4, 5, 6 in a predeterminable manner. Operating elements not shown here such as handles, levers, etc thereby ensure that the locking bolt 7 is each time moved over a certain path and/or angle so that during manual swivelling of the backrest 1 a certain backrest incline, i.e. operating position can be controlled and locked.

Figure 4:
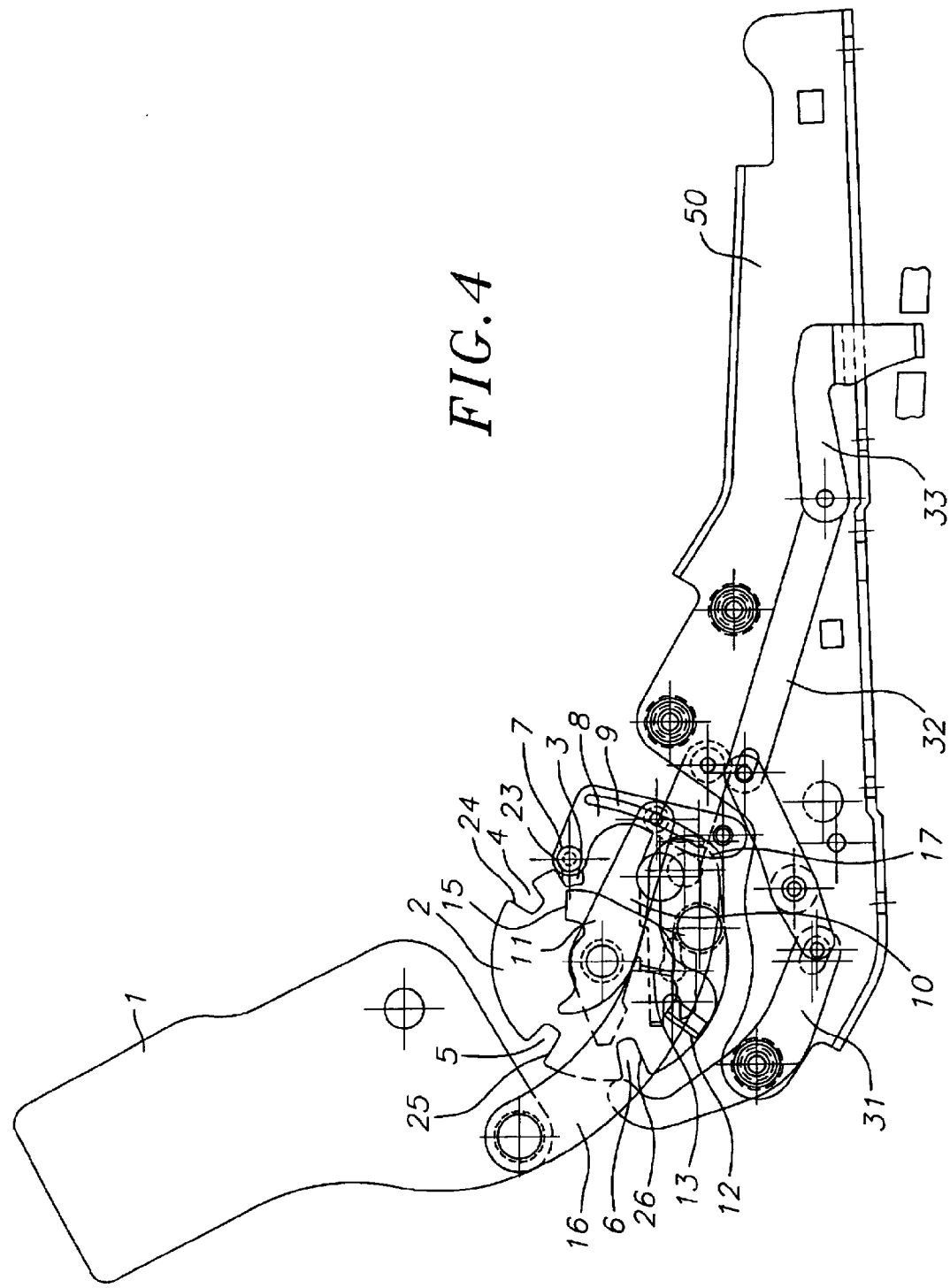
FIG. 4 shows a side view of the exemplary device shown in FIG. 1 with the device in a first operating position with the backrest unlocked.
Figure 5:
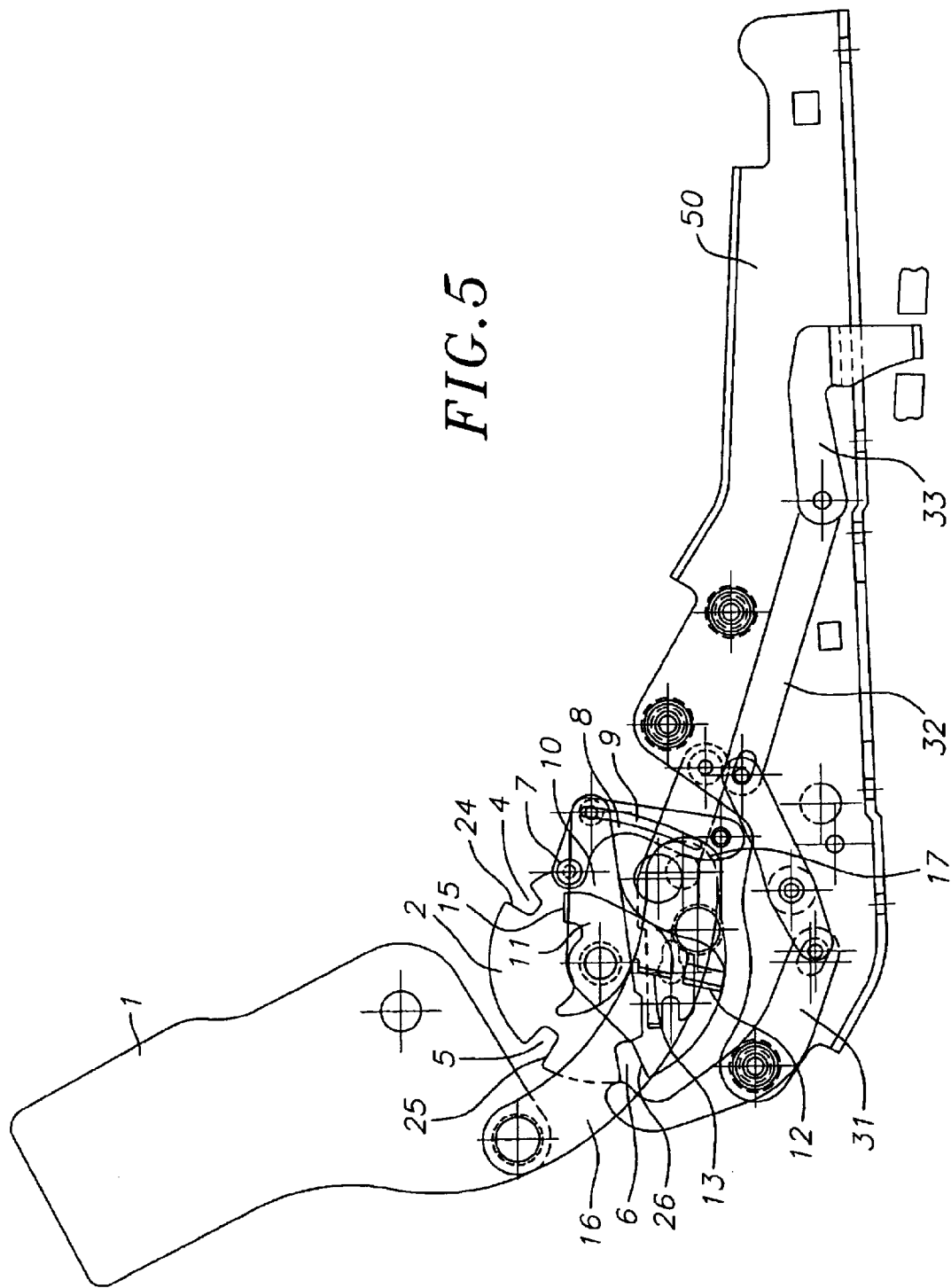
FIG. 5 shows a side view of the device shown in FIG. 4 with the device in the first operating position with the backrest locked.

The first exemplary operating position, shown in FIGS. 4 and 5, is associated with locking bolt 7 being engaged in the first recess 3. In the first operating position the backrest 1 is inclined relatively far backwards.

Figure 6:
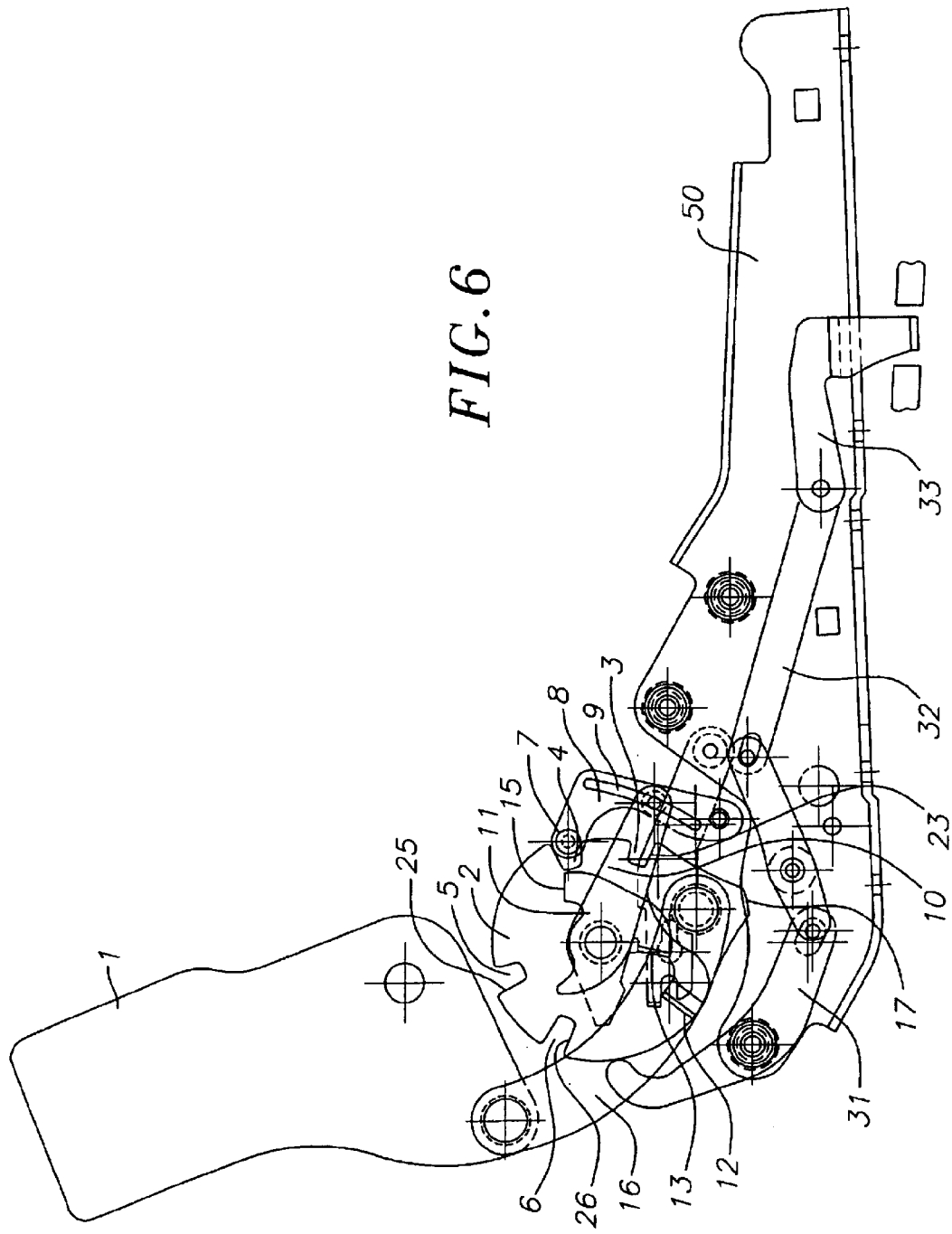
FIG. 6 shows a side view of the exemplary device shown in FIG. 1 with the device in a second operating position with the backrest unlocked.
Figure 7:
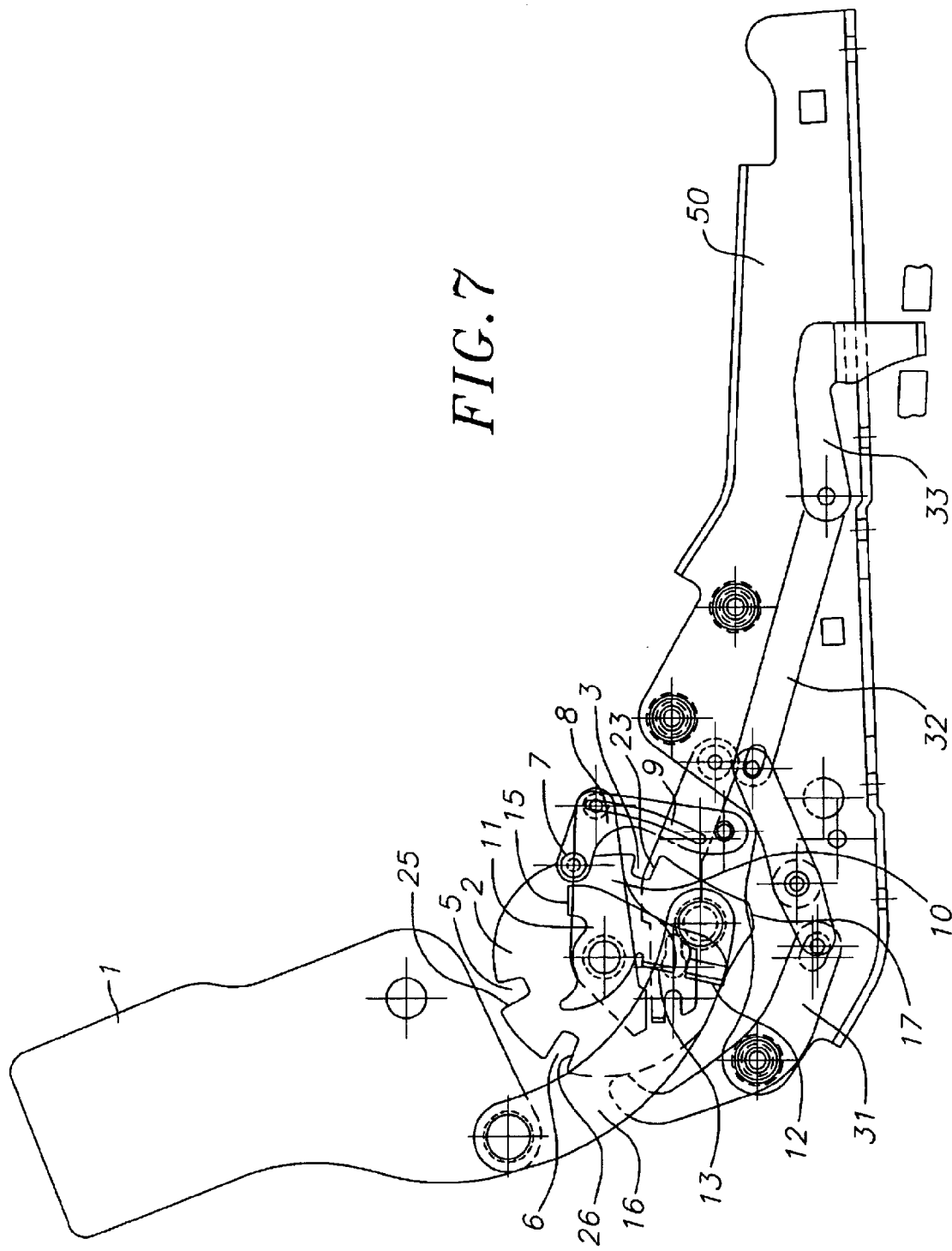
FIG. 7 shows a side view of the device shown in FIG. 6 with the device in the second operating position with the backrest locked.

The second exemplary operating position, shown in FIGS. 6 and 7, is associated with locking bolt 7 being engaged in the second recess 4. In this operating position the backrest is disposed somewhat steeper.

Figure 8:
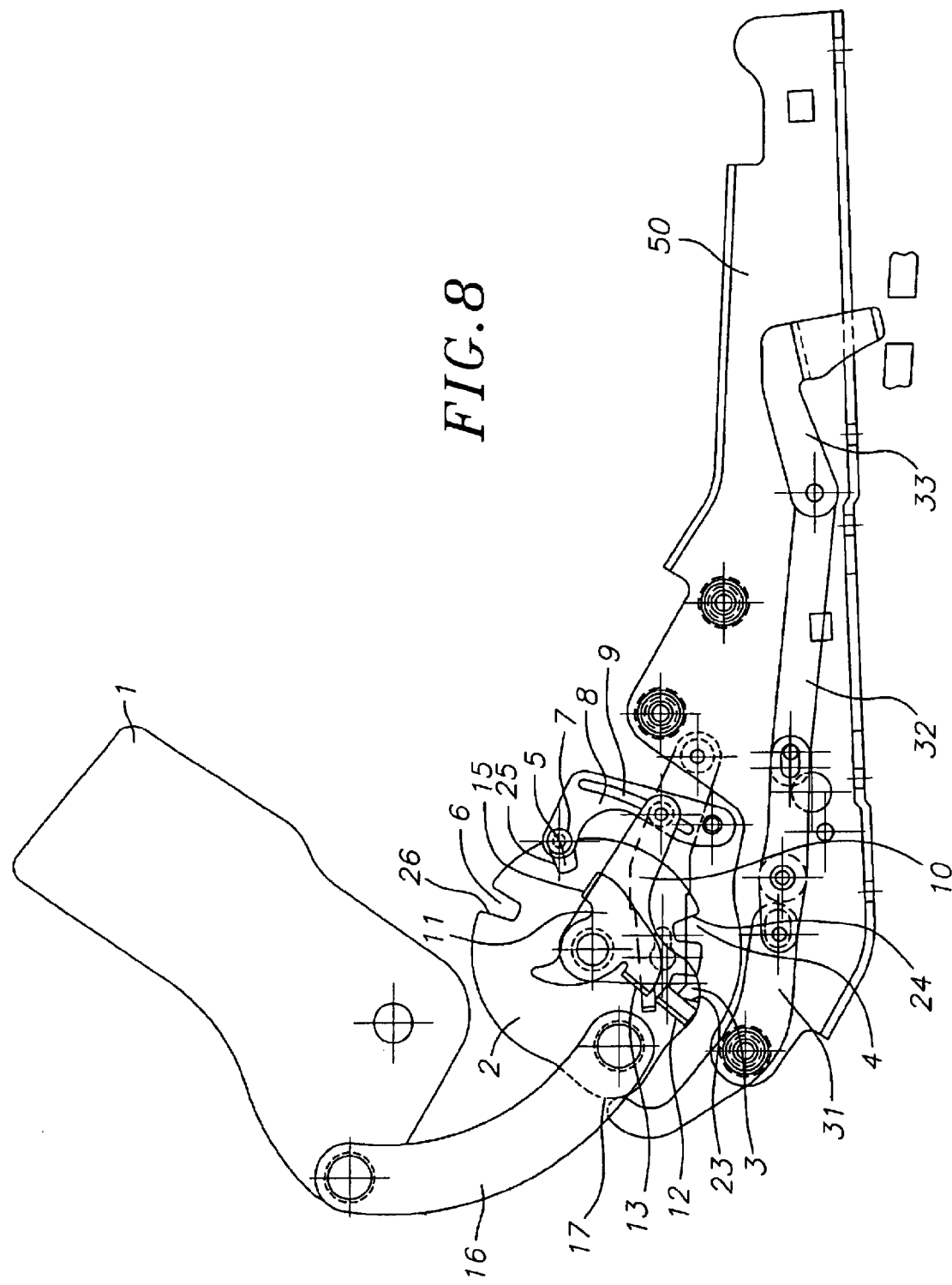
FIG. 8 shows a side view of the exemplary device shown in FIG. 1 with the device in a third operating position with the backrest unlocked.
Figure 9:
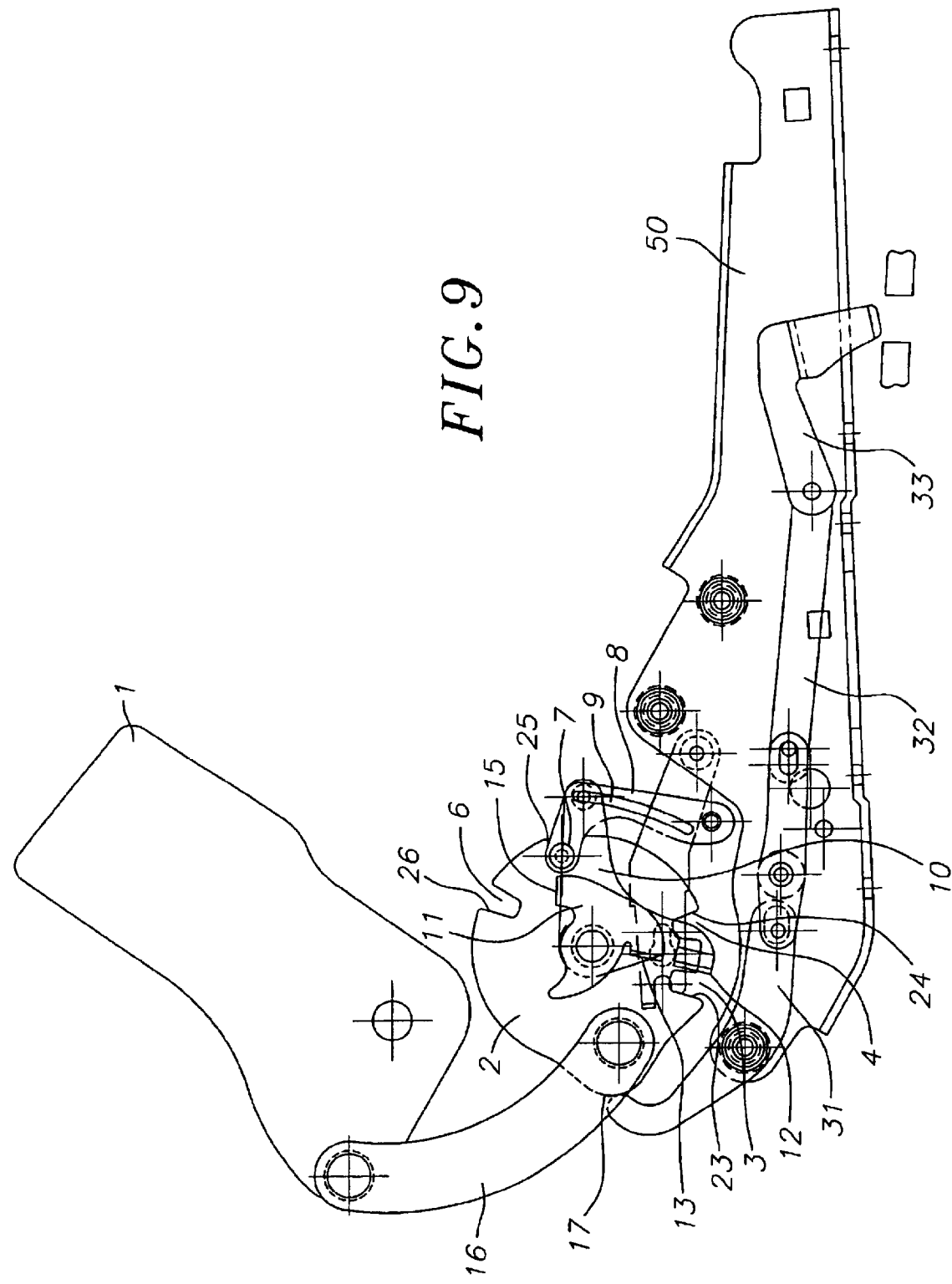
FIG. 9 shows a side view of the device shown in FIG. 8 with the device in the third operating position with the backrest locked.

The third exemplary operating position, shown in FIGS. 8 and 9, relates to the "easy entry" function, in which backrest 1 is inclined forward, as explained above.

Figure 10:
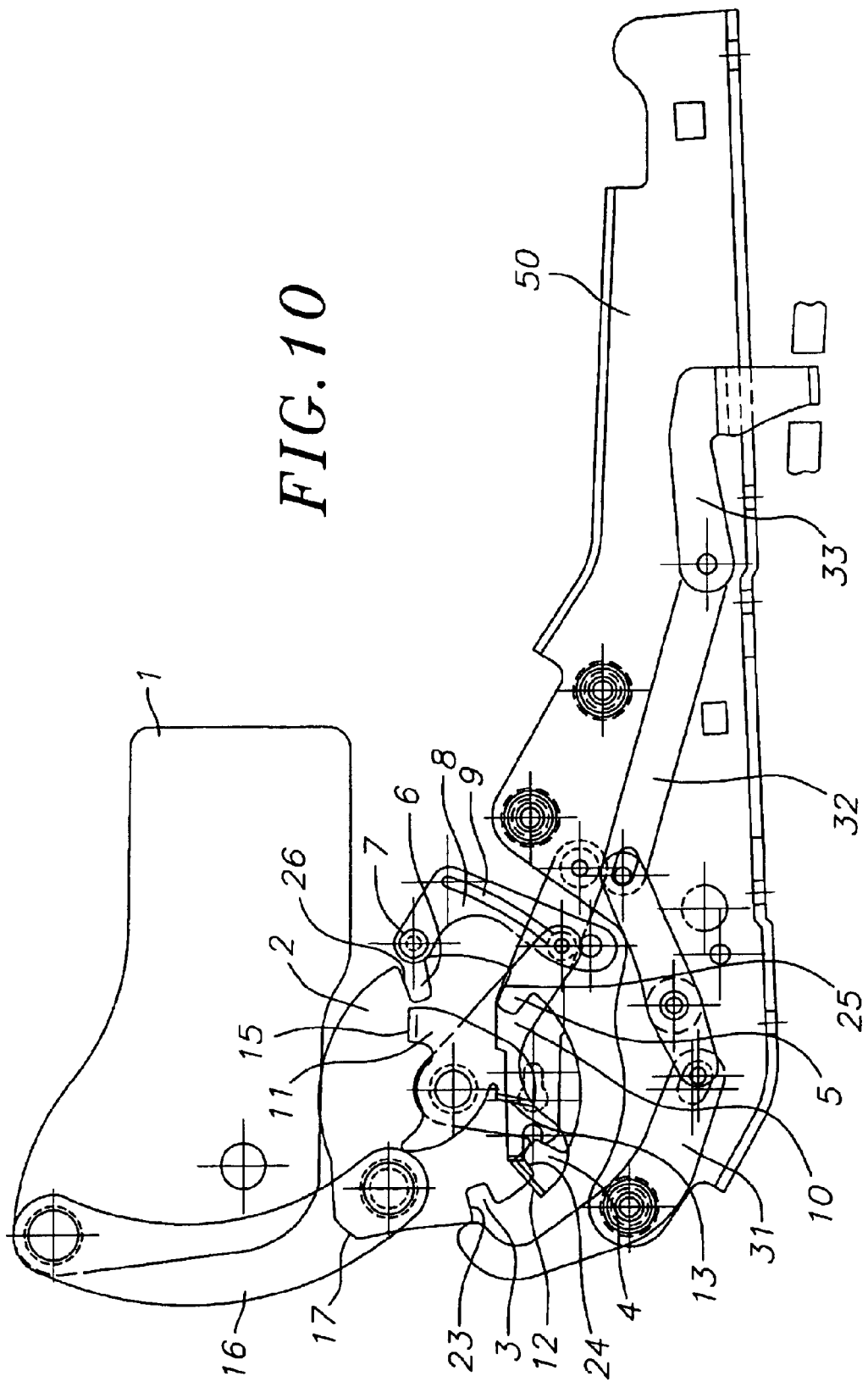
FIG. 10 shows a side view of the exemplary device shown in FIG. 1 with the device in a fourth operating position with the backrest unlocked.
Figure 11:
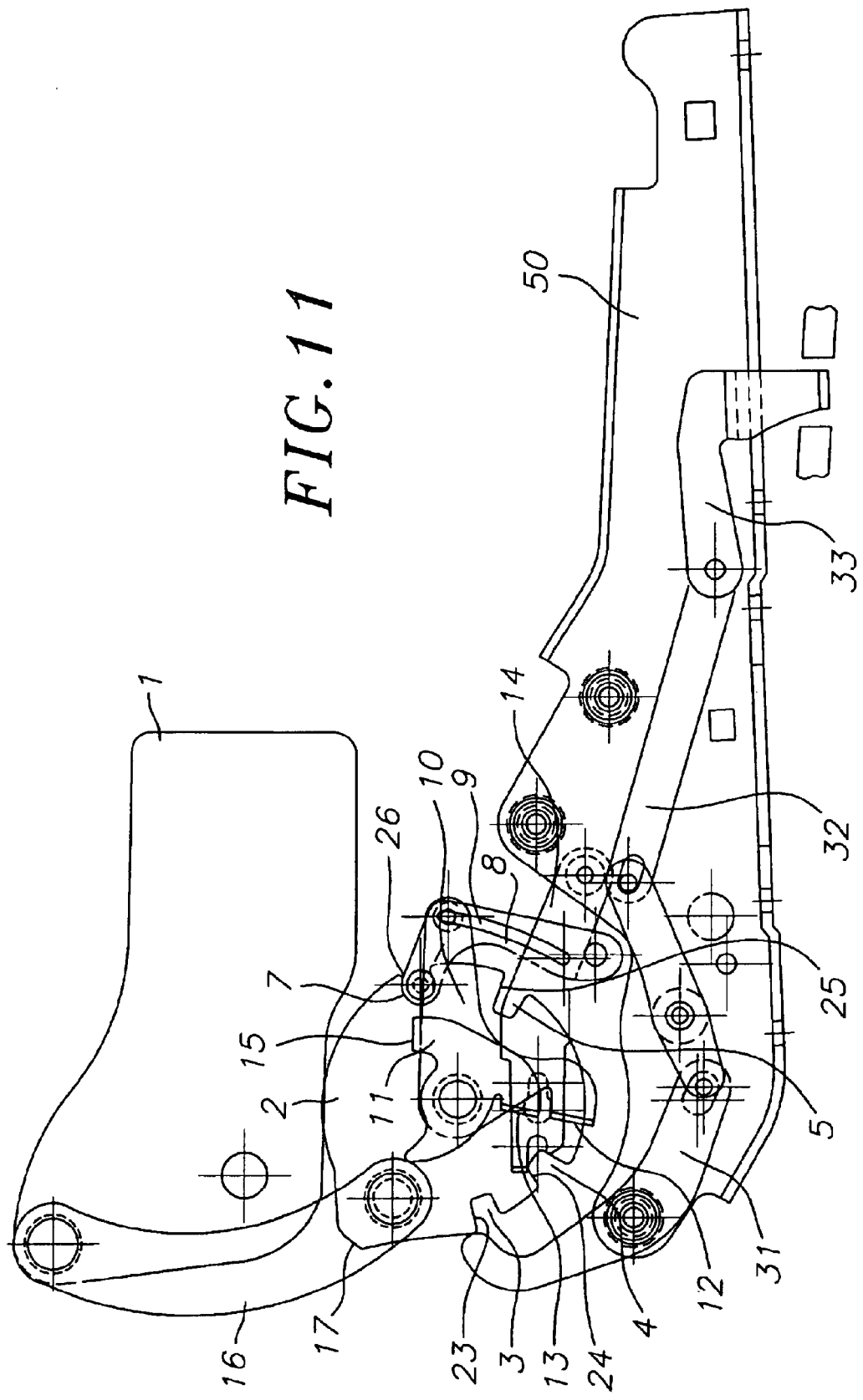
FIG. 11 shows a side view of the device shown in FIG. 10 with the device in the fourth operating position with the backrest locked.
Figure 12:
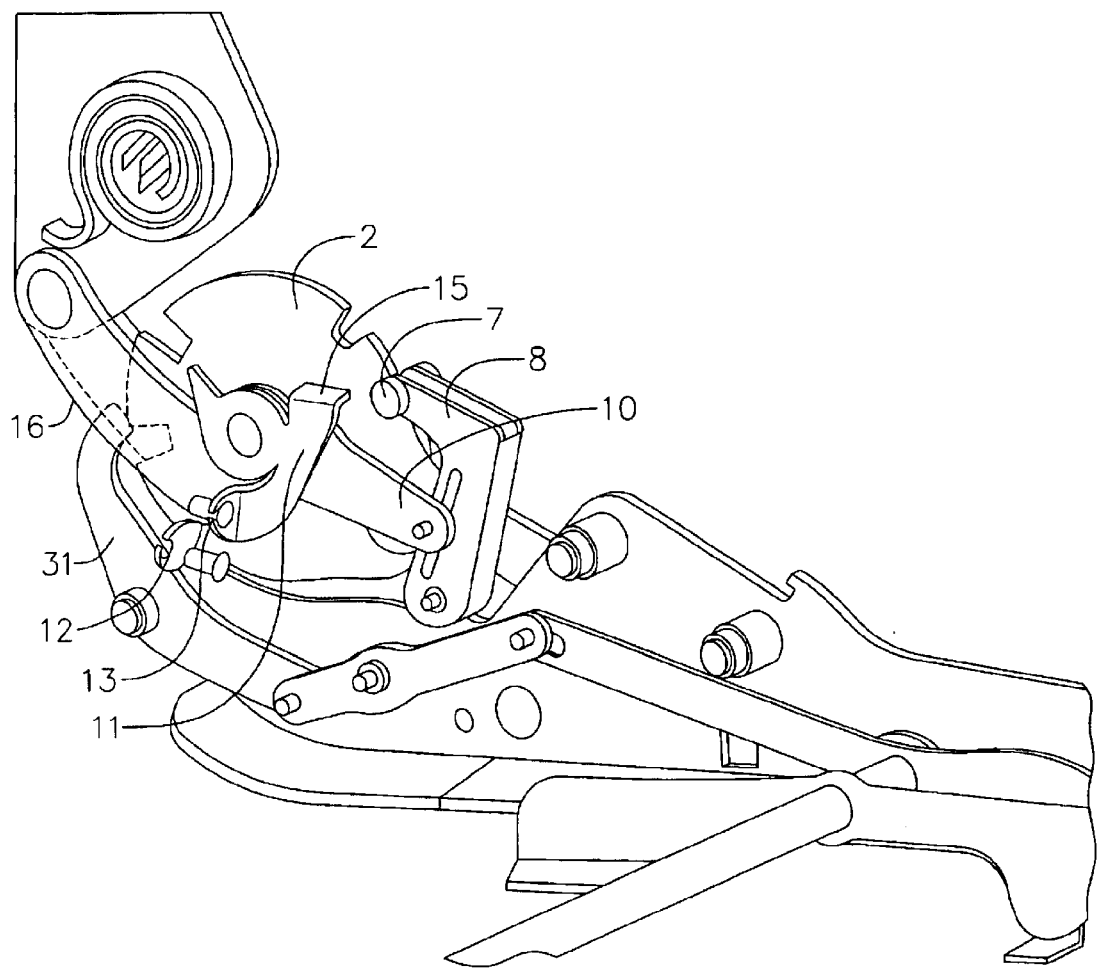
FIG. 12 shows a perspective view of an exemplary embodiment of the device of the present invention in the unlocked first operating position substantially as shown in FIG. 4.
Figure 13:
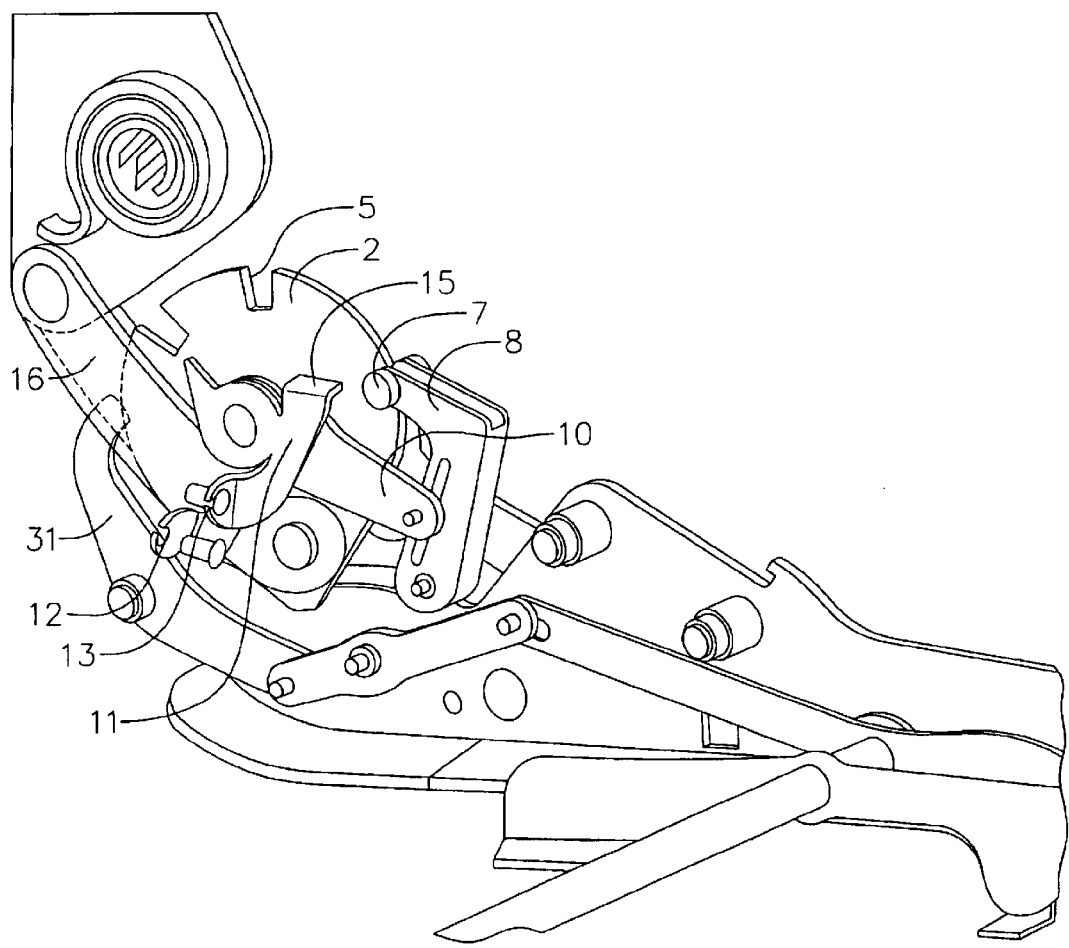
FIG. 13 shows a perspective view of an exemplary embodiment of the present invention in the unlocked second operating position substantially as shown in FIG. 6.
Figure 14:
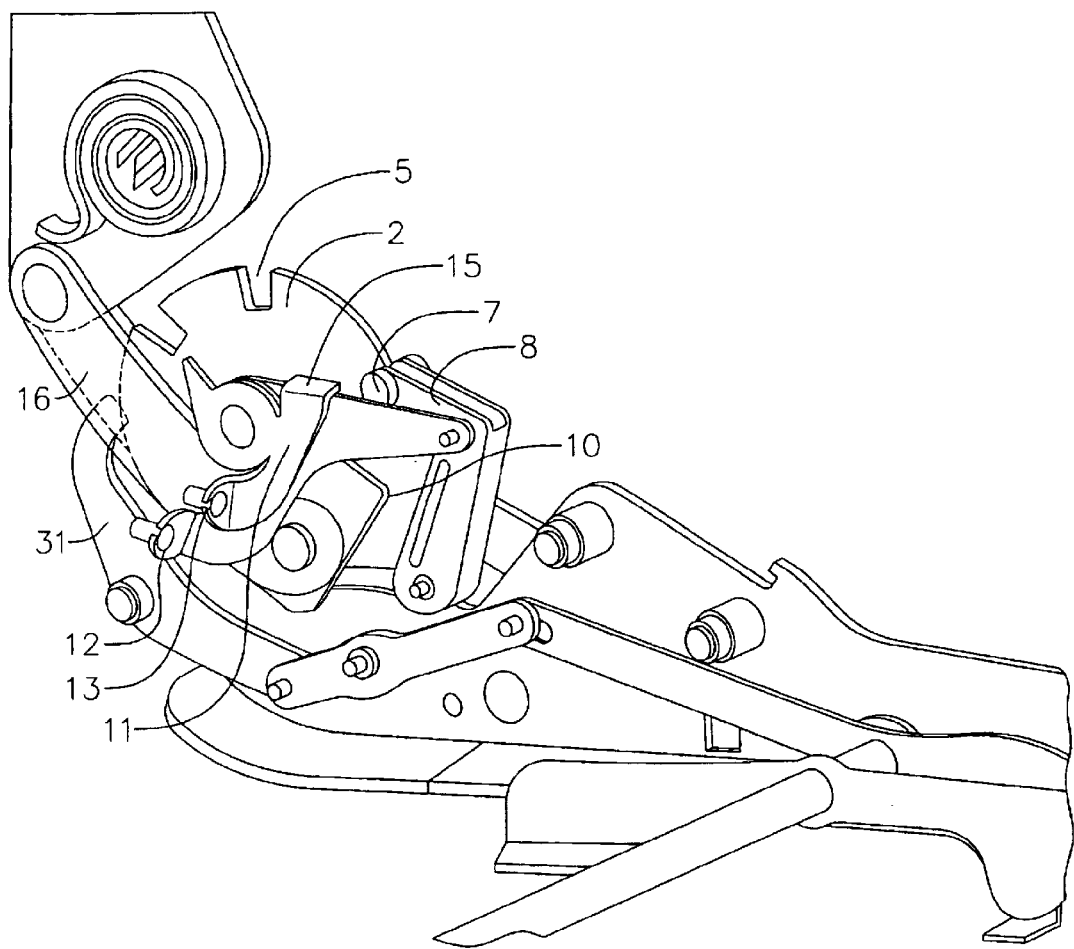
FIG. 14 shows a perspective view of an exemplary embodiment of the present invention in the locked second operating position substantially as shown in FIG. 7.
Figure 15:
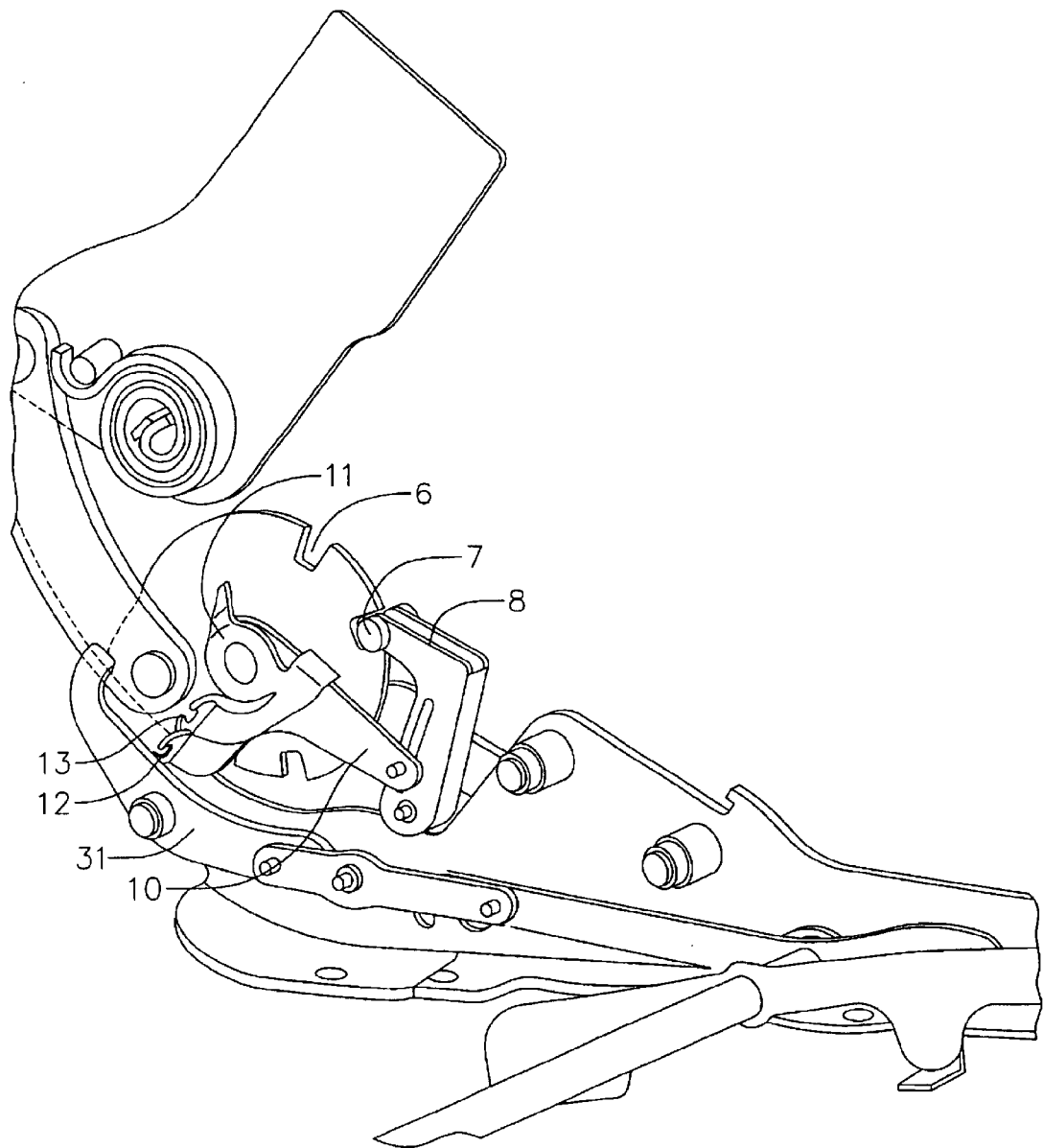
FIG. 15 shows a perspective view of an exemplary embodiment of the present invention in the unlocked third operating position substantially as shown in FIG. 8.
Figure 16:
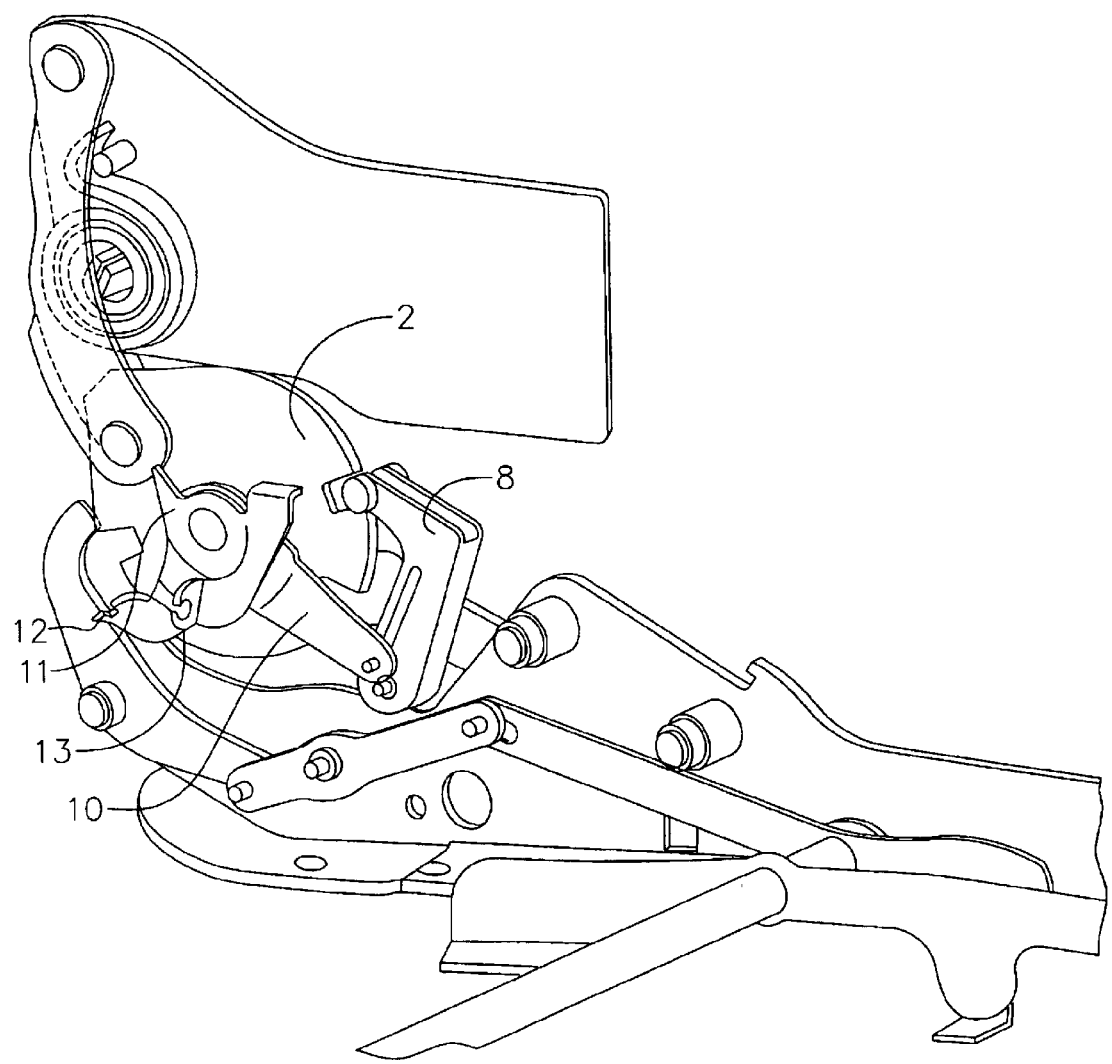
FIG. 16 shows a perspective view of an exemplary embodiment of the present invention in the unlocked fourth operating position substantially as shown in FIG. 10.
Figure 17:
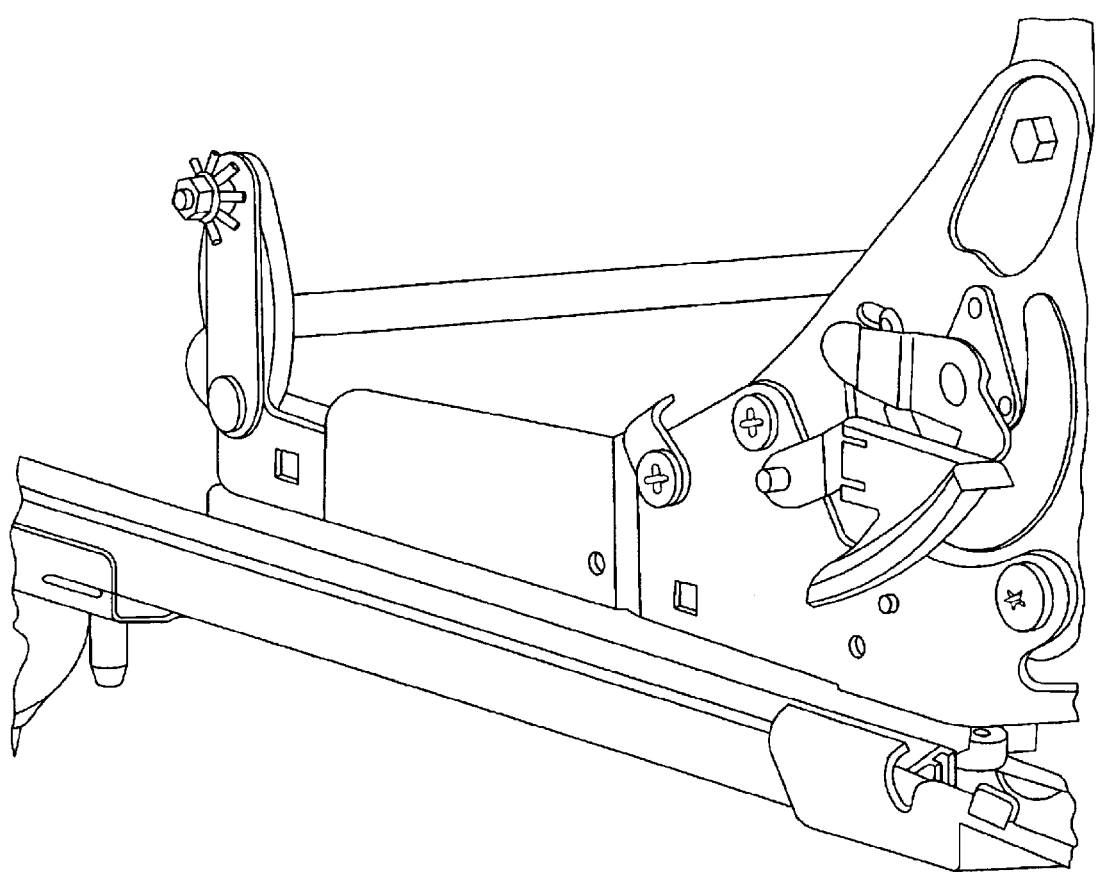
FIGS. 17 to 20 show perspective views of the device according to the backrest inclination adjustment device of the present invention mounted in a seat structure.
Figure 18:
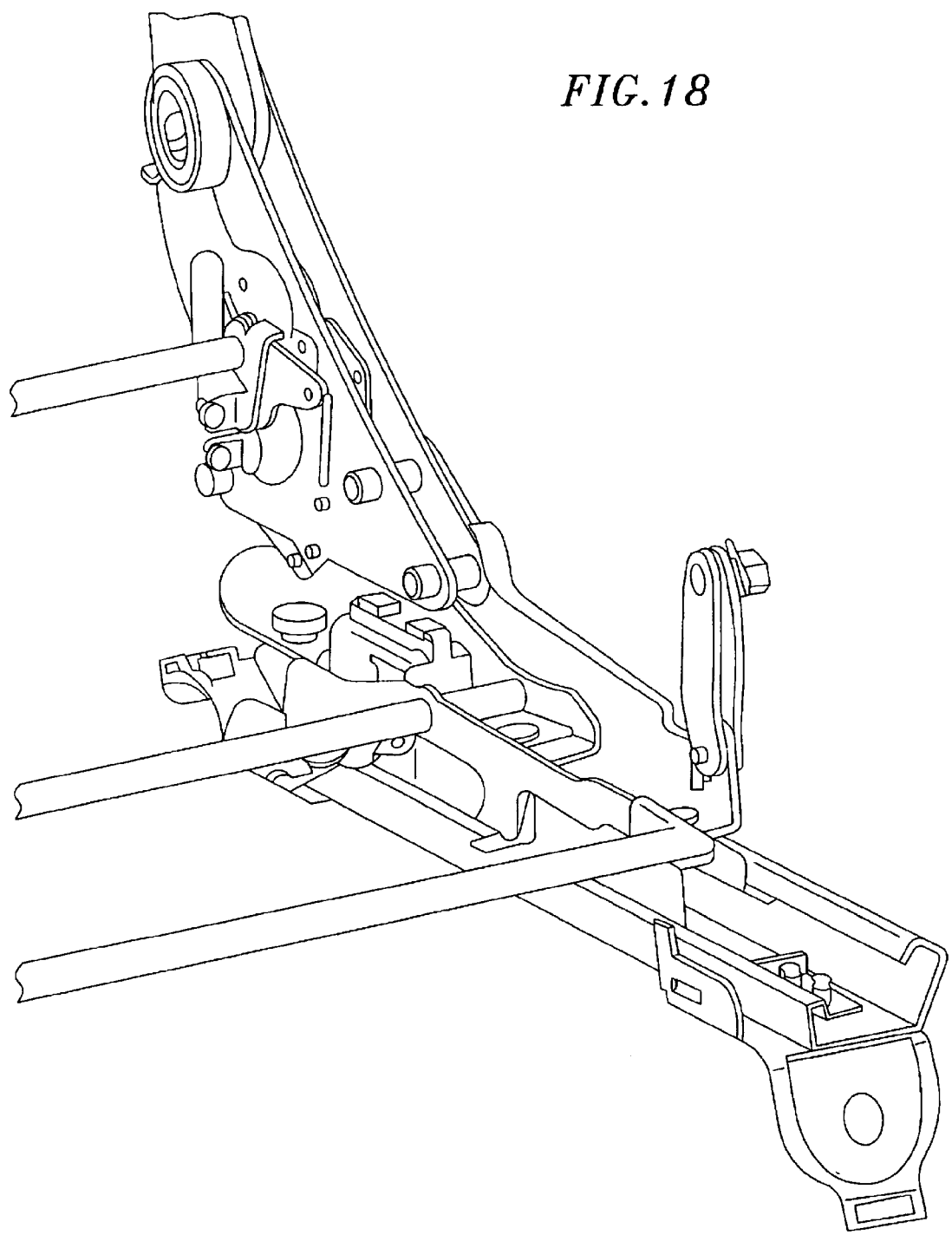
Figure 19:
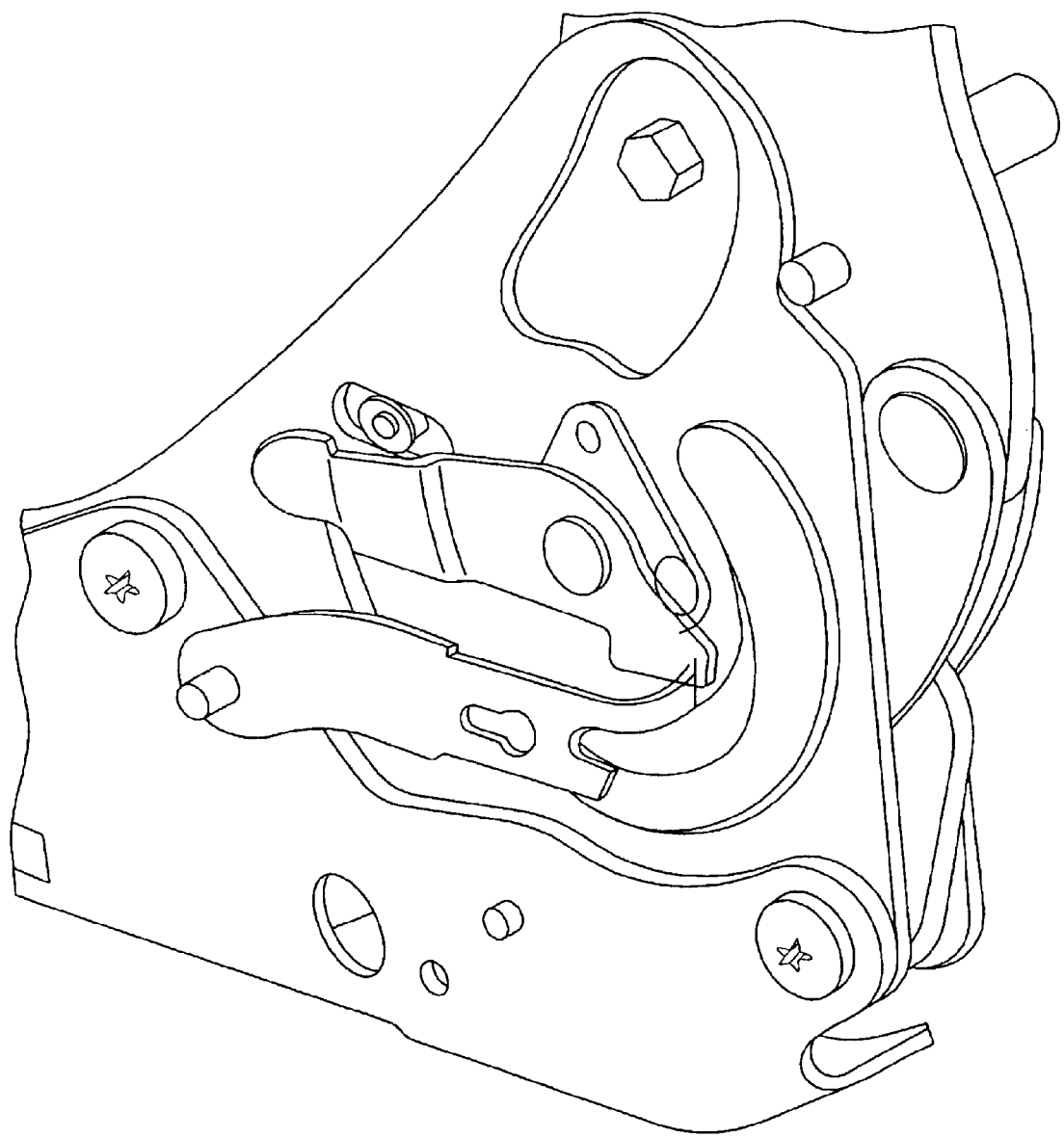
Figure 20:
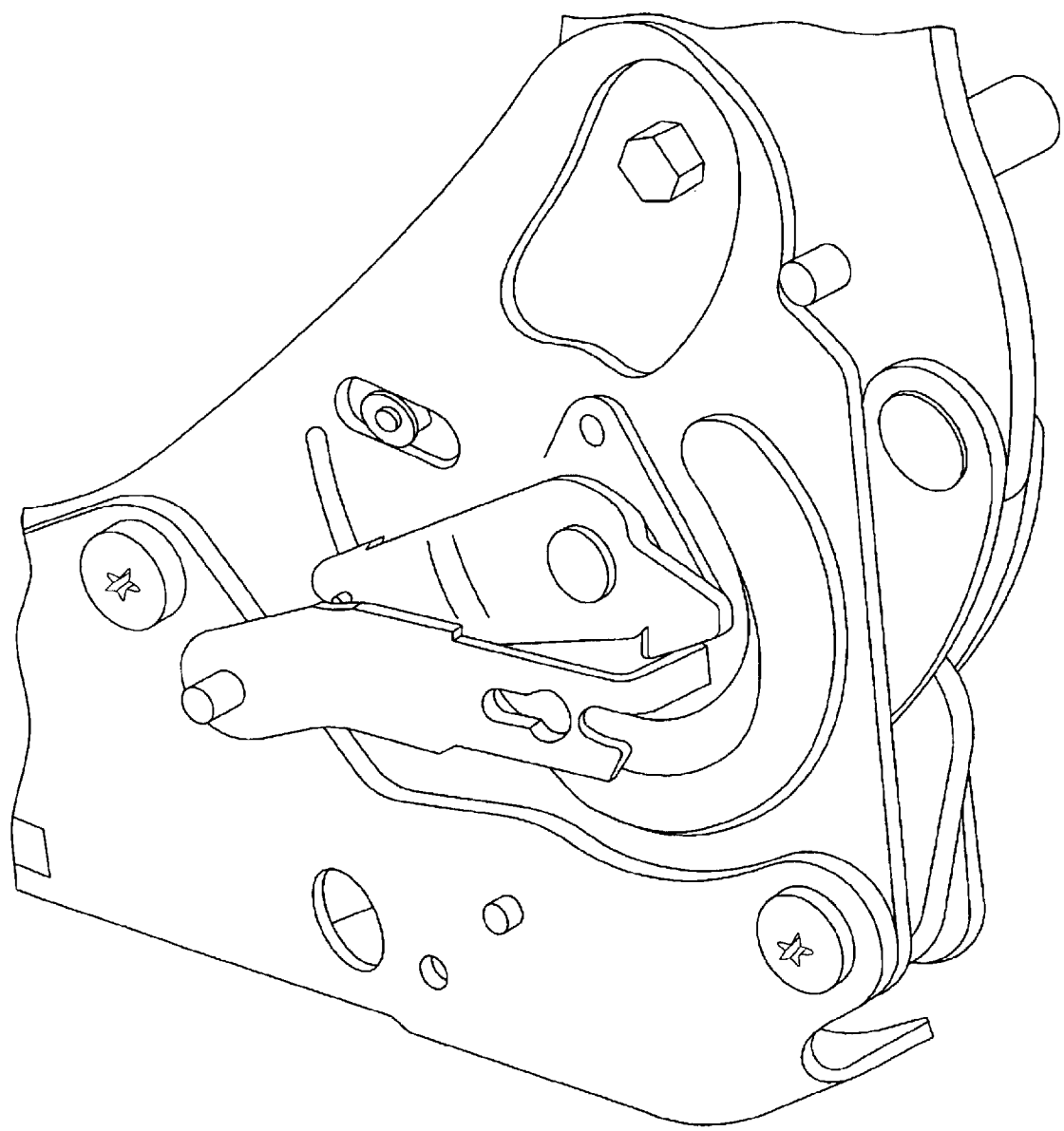

The fourth exemplary operating position, shown in FIGS. 10 and 11, relates to the substantially horizontal arrangement of the backrest 1 in which the back of the backrest 1, which appears as the top portion in FIGS. 10 and 11, can be used as a table, for example. In the fourth exemplary operating position, locking bolt 7 is positioned at fourth recess 6.

For each of the aforementioned operating positions, the device is in locking position when locking bolt 7 is engaged or secured in the associated recess.

In FIGS. 4 to 20 the same component parts are given the same reference numerals as used in FIG. 1 so that reference can be made to the description thereof.

The cam disc 2 has a complex stepped external contour which is matched to the defined position changes of the locking bolt 7. The steps of the external contour are thereby each formed by side faces 24, 25, 26 of respective recesses 4, 5, 6. For each of respective recesses 4, 5, 6, side faces 24, 25 and 26 are longer in the radial direction than the respective opposite side face of the corresponding recess 4, 5, 6.

For example, the second side face 24 of the second recess 4 is slightly longer in the radial direction than the first side face 23 of the first recess and the opposite side face of the second recess 4. The second side face forms a stop for the locking bolt 7.

In FIG. 4 the locking bolt 7 is swivelled by a lever (not shown) about a certain angle so that it becomes disengaged from first recess 3 and the cam disc 2 can rotate in a likewise certain angular region underneath the locking bolt 7.

On operating the lever the locking bolt 7 is disengaged so far that it can move up to the second side face 24 and then strike against same (see FIG. 6).

Thus by operating the lever the user can choose between the first operating position associated with recess 3 and the second operating position associated with recess 4. The locking bolt 7 can be engaged in the first recess 3 (see FIG. 5) or the second recess 4 (see FIG. 7).

If the user wants to select the "easy entry" position of the backrest and seat (the third operating position), then in the present embodiment he operates the second Bowden cable (not shown) which is mounted at the second Bowden fixing point 12 of the second rotational element 10.

Through the aforementioned swivel movement of the second rotational element 10 the locking bolt 7 is swivelled radially through the sliding mechanism of the locking lever 8 relative to the cam disc 2 so that it can proceed to the third recess 5. The side face 25 of the third recess 5 in turn projects radially slightly beyond the peripheral edge of cam disc 2 so that this projection serves as a stop for the locking bolt 7 (see FIG. 8). The locking bolt 7 may then become engaged in the third recess 5 in the detent locking action (see FIG. 9).

Opposite the recess 5 lies the cam 17 of the cam disc 2 which as described above operates the articulated lever chain 31, 32, 33 so that in this third operating position of the cam disc 2, i.e. locking bolt 7 engaged in recess 5, the seat is able to slide forward. The combination of the backrest folded forward with the seat pushed forward enables easier entry into the vehicle (easy entry).

Through the operation of the second rotational element 10, the locking bolt 7 is swivelled radially further outwards through the slide mechanism of the locking lever 8 relative to the cam disc so that it can overcome the step of the side face 25 and can pass up to the fourth recess 6, as shown in FIG. 10. In this position the backrest 1 can be brought into a substantially horizontal position so that it can be used as a table, for example. In this position the locking bolt 7 can be locked with the fourth recess 6 (see FIG. 11).

Although the device, according to an exemplary embodiment of the invention, is described with respect to a cam disc 2 with four recesses 3, 4, 5, 6 (i.e. four operating positions), such description is intended to be illustrative and not limiting of the present invention.

In other exemplary embodiments, more than four recesses can also be arranged on the cam disc 2 in order to enable a larger number of operating positions. Thus for example two different "easy-entry" positions can be defined. The detent locking means of cam disc 2 can also have instead of recesses radially protruding teeth which would be a type of negative image of the cam disc 2 with recesses. In the embodiment in which the cam disc 2 includes radially protruding teeth, the cam disc 2 may include at least one tooth being longer or shorter than the other teeth.

Also the detent locking means is not limited to being a member having a disc-shaped design. In other exemplary embodiments, the detent locking means may include members which could be cylindrical whereby the individual steps of the detent locks are formed by a radial staircase like structure lockable in the axial direction by a detent locking element.

FIGS. 12 to 20 show perspective views of an embodiment of the device according to the invention. The same components are used as in the embodiments of FIGS. 1 to 11 so that reference is made to the above description. The equivalent operating positions to those shown in FIGS. 12 to 20 are given in the list of drawings provided above.

The invention is not restricted in its design to the preferred embodiments given above. Rather a number of variations is possible which use the device according to the invention even in fundamentally different designs.

What is claimed is:

1. A device for adjusting the backrest inclination of a backrest of a seat, comprising:

a backrest connected to a rotatable detent locking device which, in order to adjust the backrest inclination, is lockable in defined detent locking positions by an adjustable detent locking element, wherein the detent element is positionable in defined spatial positions by at least two operating mechanisms such that, in at least one spatial position of said spatial positions, the detent locking element is lockable in only a partial number of the defined detent locking positions and the at least two operating mechanisms are operable independently of each other.

2. A device for adjusting the backrest inclination of a backrest of a seat, comprising:

a backrest connected to a rotatable detent locking device which, in order to adjust the backrest inclination, is lockable in defined detent locking positions by an adjustable detent locking element, wherein the detent locking element is positionable in defined spatial positions by at least one operating mechanism such that, in at least one spatial position of said spatial positions, the detent locking element is lockable in only a partial number of the defined detent locking positions, and the detent locking device has a release mechanism through which, in the event of a predetermined inclination of the backrest, locking of the horizontal adjustment of the seat is one of automatically released and locked.

3. The device according to claim 1 or 2, wherein the detent locking device includes a shape with at least one stop to position the detent locking element in a certain position and the detent locking element in this certain position, is lockable in only a partial number of the detent locking positions.

4. The device according to claim 1 or 2, wherein the detent locking device includes a member that is disc shaped and the detent locking element is lockable in radially arranged recesses of said disc shaped member of said detent locking device.

5. The device according to claim 4, wherein at least one of the recesses includes a side face formed radially longer than an opposed side face of the corresponding recess in order to form a stop for the detent locking element.

6. The device according to claim 1 or 2, wherein the detent locking device is formed substantially as a toothed wheel wherein at least one tooth is longer or shorter than the other teeth.

7. The device according to claim 1 or 2, wherein the detent locking device includes a member that is cylindrical in shape and has a concentric circumferential structure for axially engaging with the detent locking element.

8. The device according to claim 1 or 2, further comprising a swivel-mounted locking lever and wherein the detent locking element is disposed as a bolt on the swivel-mounted locking lever.

9. The device according to claim 8, wherein the position of the detent locking element is changeable by swivelling the locking lever.

10. The device according to claim 9, wherein the locking lever has a slide guide and is connectable with at least one of the operating mechanisms by said slide guide.

11. The device according to claim 8, wherein the locking lever has a slide guide and is connectable with at least one of the operating mechanisms by said slide guide.

12. The device according to claim 2, wherein the release mechanism comprises one of a cam and a Bowden cable connection.

13. The device according to claim 1, wherein the backrest forms part of a motor vehicle seat.

* * * * *

UNITED STATES PATENT AND TRADEMARK OFFICE
CERTIFICATE OF CORRECTION

PATENT NO. : 6,926,362 B2  Page 1 of 1
DATED : August 9, 2005
INVENTOR(S) : Kroner et al.

It is certified that error appears in the above-identified patent and that said Letters Patent is hereby corrected as shown below:

Title page,
Item [75], Inventors, delete "Bahnhofstrasse", insert -- Bahnhofsstrasse --.
Item [56], References Cited, OTHER PUBLICATIONS,
"English translation of International Preliminary Examination Report..." reference, delete "PCT/DE01/03770", insert -- PCT/DE01/03700 --.
Insert the following:
-- International Search Report of PCT/DE01/03700, dated 05-22-2002
International Preliminary Examination Report of PCT/DE01/03700, dated 12-03-02 --.

Column 1,
Line 9, delete "Application No. 10 228.7, filed", insert -- Application No. 100 48 228.7, filed --.

Column 3,
Line 37, delete "au", insert -- an --.

Column 6,
Line 38, delete "the detent element", insert -- the detent locking element --.

Signed and Sealed this

Twenty-fifth Day of April, 2006

JON W. DUDAS
*Director of the United States Patent and Trademark Office*